(12) United States Patent
Gavriliuc et al.

(10) Patent No.: US 10,203,781 B2
(45) Date of Patent: Feb. 12, 2019

(54) INTEGRATED FREE SPACE AND SURFACE INPUT DEVICE

(71) Applicant: Microsoft Technology Licensing, LLC, Redmond, WA (US)

(72) Inventors: Anatolie Gavriliuc, Kirkland, WA (US); Shawn Crispin Wright, Sammamish, WA (US); Jeffrey Alan Kohler, Redmond, WA (US); Quentin Simon Charles Miller, Sammamish, WA (US); Scott Francis Fullam, Palo Alto, CA (US); Sergio Paolantonio, Bellevue, WA (US); Michael Edward Samples, Redmond, WA (US); Anthony James Ambrus, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 67 days.

(21) Appl. No.: 15/192,329

(22) Filed: Jun. 24, 2016

(65) Prior Publication Data

US 2017/0371432 A1    Dec. 28, 2017

(51) Int. Cl.
 *G06F 3/041*  (2006.01)
 *G06F 3/038*  (2013.01)
 (Continued)

(52) U.S. Cl.
 CPC ............ *G06F 3/0383* (2013.01); *G06F 3/011* (2013.01); *G06F 3/016* (2013.01); *G06F 3/017* (2013.01);
 (Continued)

(58) Field of Classification Search
 CPC .. G06F 3/0338; G06F 3/0346; G06F 3/03545; G06F 3/0383; G06F 3/046;
 (Continued)

(56) References Cited

U.S. PATENT DOCUMENTS 9,116,558 B2 8/2015 Yilmaz et al.
9,886,102 B2 * 2/2018 Hosenpud ............. G06F 3/0346
(Continued)

OTHER PUBLICATIONS

"The Apple Pencil is the iPad Pro's Secret Weapon", Retrieved on: Nov. 20, 2015 Available at: https://www.quora.com/Whats-so-special-about-the-Apple-Pencil#!n=12.
(Continued)

*Primary Examiner* — Nelson Rosario
(74) *Attorney, Agent, or Firm* — Alleman Hall Creasman & Tuttle LLP

(57) ABSTRACT

In various embodiments, methods and systems for implementing integrated free space and surface inputs are provided. An integrated free space and surface input system includes a mixed-input pointing device for interacting and controlling interface objects using free space inputs and surface inputs, trigger buttons, pressure sensors, and haptic feedback associated with the mixed-input pointing device. Free space movement data and surface movement data are tracked and determined for the mixed-input pointing device. An interface input is detected for the mixed-input pointing device transitioning from a first input to a second input, such as, from a free space input to a surface input or from the surface input to the free space input. The interface input is processed based on accessing the free space movement data and the surface movement data. An output for the interface input is communicated from the mixed-input pointing device to interact and control an interface.

15 Claims, 9 Drawing Sheets

(51) Int. Cl.
*G06F 3/01* (2006.01)
*G06F 3/0346* (2013.01)
*G06F 3/0354* (2013.01)
*G06T 19/00* (2011.01)
*G06F 3/03* (2006.01)

(52) U.S. Cl.
CPC ............ *G06F 3/0304* (2013.01); *G06F 3/038* (2013.01); *G06F 3/0346* (2013.01); *G06F 3/03542* (2013.01); *G06F 3/03545* (2013.01); *G06T 19/006* (2013.01); *G06F 2203/0381* (2013.01); *G08C 2201/32* (2013.01)

(58) Field of Classification Search
CPC ........ G06F 3/0321; G06F 3/011; G06F 3/016; G06F 3/017; G06F 3/0304; G06F 3/03542; G06F 3/038; G06F 2203/0381; G06K 7/10; G02B 6/04; G02B 6/3624; G02B 6/4298; G06T 19/006; G08C 17/02; G08C 2201/32; G08C 2201/71
See application file for complete search history.

(56) References Cited

U.S. PATENT DOCUMENTS

| | | | |
|---|---|---|---|
| 2010/0105480 | A1 | 4/2010 | Mikhailov et al. |
| 2013/0257777 | A1* | 10/2013 | Benko ................. G06F 3/03545 345/173 |
| 2014/0028635 | A1* | 1/2014 | Krah ....................... G06F 3/041 345/179 |
| 2014/0145955 | A1 | 5/2014 | Gomez et al. |
| 2014/0320408 | A1 | 10/2014 | Zagorsek et al. |
| 2015/0086114 | A1 | 3/2015 | Todeschini |
| 2015/0109322 | A1 | 4/2015 | Friesen |
| 2015/0205351 | A1* | 7/2015 | Osterhout ............... G06F 3/012 345/156 |
| 2015/0234518 | A1 | 8/2015 | Teller et al. |
| 2016/0139690 | A1* | 5/2016 | Chang .................. G06F 3/0383 345/179 |

OTHER PUBLICATIONS

"Write as Fast as you Think", Published on: Mar. 31, 2015, Available at: https://www.microsoft.com/surface/en-us/accessories/surface-pen.

"Tilt Brush Painting Exhibition with the HTC Vive", Published on: Jun. 17, 2015, Available at: https://www.youtube.com/watch?v=a3zpp33w-QI.

"Microsoft Hololens: Bring Products and Information to Life", Retrieved on: Nov. 20, 2015, Available at: https://www.microsoft.com/microsoft-hololens/en-us/commercial#fullbleed-volvo.

"Atheer AiR", Retrieved on: Nov. 20, 2015, Available at: http://atheerair.com/.

"PS4: Breathtaking VR Immersion", Retrieved on: Nov. 20, 2015, Available at: https://www.playstation.com/en-in/explore/ps4/features/playstation-vr/.

"OTM Technologies : Make the world your paper with Phree", Retrieved on: Nov. 20, 2015, Available at: http://otmtech.com/.

Hinckley, et al., "Motion and Context Sensing Techniques for Pen Computing", In Proceedings of Graphics Interface, May 29, 2013, pp. 71-78.

Pierce, David, "Pens Are Making a High-Tech Comeback", Published on: Jul. 7, 2015, Available at: http://www.wired.com/2015/07/the-pen-is-back/.

Lee, Max, "HTC Vive VR Unboxing", Retrieved from: <<https://www.youtube.com/watch?v=_Tj6DcMcptY&t=822s>>, May 4, 2016, 3 Pages.

"International Search Report and Written Opinion Issued in PCT Application No. PCT/US2017/037086", dated Aug. 10, 2017, 19 Pages.

* cited by examiner

INTEGRATED FREE SPACE AND SURFACE INPUT DEVICE

BACKGROUND

Computing systems receive input from pointing devices to control user interfaces (e.g., graphical user interfaces). For example, a mouse detects two-dimensional (2D) motion relative to a surface and communicates the detected motion to a computing system. The computing system then typically translates the detected motion to interface controls, such as, a point on a display to control a graphical user interface. Pointing devices also include one or more snap-action switches that can be actuated. A snap-action switch can support a tipping-point mechanism (e.g., drag and drop) for controlling graphical interface objects on a computer interface. As such, interface control devices are an integral part of interacting with computing systems to communicate interface controls.

SUMMARY

Embodiments of the present invention are directed to an integrated free space and surface input device. The integrated free space and surface input device can refer to a mixed-input pointing device. The mixed-input pointing device can include several components, operating based on an integrated free space and surface input system, that support providing free space input and surface input for controlling interface objects of computing systems. The free space input and surface input are tracked on a single device as movement data and communicated as output to a computing system. The output is used to control interface objects (e.g., computer display objects or augmented reality objects) associated with displays (e.g., monitor displays or head mount unit displays). In this regard, movement data from free space tracking and surface tracking can be intelligently combined to perform desired operations on displayed interface objects.

In operation, free space movement data and surface movement data can be tracked and determined for the mixed-input pointing device. An interface input is detected for the mixed-input pointing device transitioning from a first input to a second input, such as, from a free space input to a surface input or from a surface input to a free space input. The interface input is processed based on accessing the combination of the free space movement data and surface movement data. An output for the interface input is communicated from the mixed-input pointing device to control an interface.

The mixed-input pointing device operates with different types of computer display objects and augmented reality objects in various display configurations. In particular, the interface input from the mixed-input pointing device is operable to control interface objects that are displayed independently or simultaneously as computer display objects and/or augmented reality objects. A selected interface object is simultaneously controllable based on free space input and surface input. The interface object can be controlled in free space using free space movement data and when the mixed-input pointing device starts receiving and tracking surface input, the surface movement data can be incorporated to trigger interface controls.

Additionally, trigger buttons, pressure sensors, free space haptic feedback and surface haptic feedback can be processed at the mixed-input pointing device to support additional interface controls and feedback, in particular, interface controls and feedback based on integrated free space input and surface input. For example, the haptic feedback can transition from free space haptic feedback to surface haptic feedback and from surface haptic feedback to free space haptic feedback based on the interface input transitioning between different inputs.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
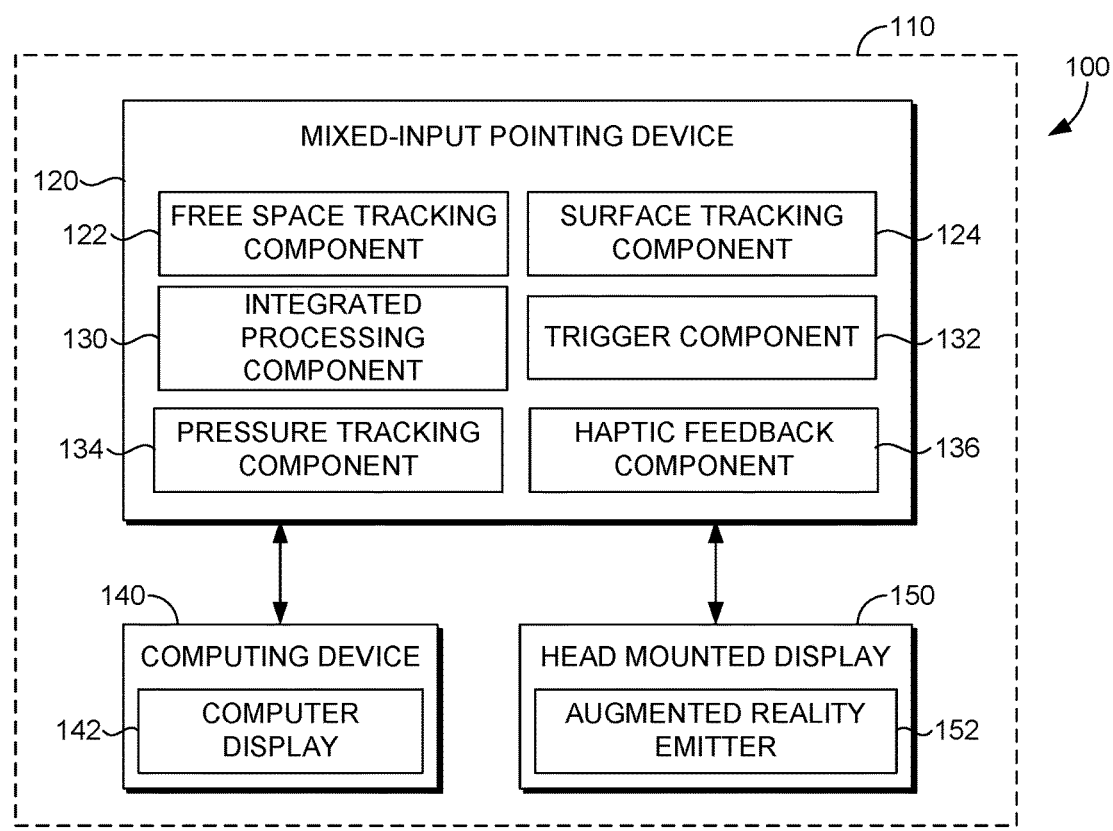
FIG. 1 is a schematic showing an exemplary integrated free space and surface input system, in accordance with embodiments of the present invention.

Computing systems receive input from pointing devices to control user interfaces (e.g., graphical user interfaces). For example, a mouse detects two-dimensional (2D) motion relative to a surface and communicates the detected motion to a computing system. The computing system then typically translates the detected motion to interface controls, such as, a point on a display to control a graphical user interface. Control can further include interactive activity and feedback (e.g., visual feedback and haptic feedback). Pointing devices also include one or more snap-action switches that can be actuated. A snap-action switch can support a tipping-point mechanism (e.g., drag and drop) for controlling graphical interface objects on a computer interface. Technological development has led to computing systems that are operable with input from free space. For example, video game system controllers and mobile phones support user controls based on motion sensing capabilities in 3D space. As such, interface control devices are an integral part of interacting with computing systems to communicate interface controls.

An exemplary device interface that can be controlled based on free space input is an augmented reality device. An augmented reality device can support the presentation of augmented reality images. Augmented reality images include augmented reality objects, which are virtualized objects or entities (e.g., holographic content or mixed-reality content), that are rendered for a user associated with the augmented reality device. In particular, the augmented reality objects can be rendered based on a real world environment, where the real world environment can be captured in a digital representation by the augmented reality device. Understanding the real world environment can be based on several different techniques that provide the augmented reality device with information about the environment. For example, an environment can be scanned in real-time and a mesh representation of the environment can be dynamically generated to provide the augmented reality device with information about the environment.

As such, augmented reality devices can support augmented reality or mixed-reality experiences. Such experiences include navigating through real world environments based on augmented reality objects or viewing augmented reality objects ("AR objects") in combination with the real world environment. AR objects can include a hologram catalogue of 3D objects or virtual images that can be placed and scaled around a user. AR objects can be used in a variety of different implementations (e.g., video games, entertainment, productivity tools, etc.) as entities that can be controlled through a graphical user interface from actuators from the user via the mixed-input pointing device described herein. For example, a user can design 3D objects in a 3D modeling studio application based on controls from free space indicating controls to be performed on an interface associated with the 3D object and 3D model studio application. Conventional 2D pointing devices can also be used to control augmented reality objects represented on a 2D display. With several computing systems, augmented reality devices in particular, that support both surface input and free input, it can become tedious to transition between multiple input devices to control interface objects. In addition, free space tracking systems lack the precision of surface tracking systems, that make relying solely on free space input difficult. For instance, visual tracking cameras may perform free space tracking, but might be hindered by reduced field of view when moved near a surface. A comprehensive approach for handling free space input and surface input can advantageously improve interface controls for computing systems.

Embodiments of the present invention provide simple and efficient methods and systems for integrated free space and surface input. In embodiments, a mixed-input pointing device can include several components that support providing free space and surface input for controlling interface objects of computing systems. A mixed-input pointing device can refer to a single device that is used to specify a position in free space and surface space. The combination of the free space position information independently and in combination with the surface position information can be captured based on movement data and communicated to control a graphical user interface. Control can include interactive activity and feedback (e.g., visual feedback and haptic feedback) that is generated based on the movement data. The mixed-input pointing device can support both direct input and indirect input. Direct input can include input space that is concurrent with the display space. Indirect input can include input space that is a surface, where the movement is tracked.

The mixed-input pointing device supports different types of computer display objects and augmented reality objects in various display configurations. In particular, the interface input from the mixed-input pointing device is operable to control interface objects that are displayed independently or simultaneously as computer display objects or augmented reality objects. A selected interface object is simultaneously controllable based on free space input and surface input. The interface object can be controlled in free space using free space movement data and when the mixed-input pointing device starts receiving and tracking surface input, the surface movement data can be incorporated to trigger interface controls.

In an exemplary embodiment, the mixed-input pointing device can be a pen-like controller. The pen-like controller can include at least one micro-switch button operable to cause interaction with a graphical user interface associated with the mixed-input pointing device. Micro-switch buttons can correspond to right click and left click buttons on a conventional computer mouse. The mixed-input pointing device can further track pressure data (e.g., surface pressure data or free space pressure data) for pressure sensitive controls on interface objects. Pressure sensitive controls can be based on a pressure sensitive tip on the mixed-input pointing device or a pressure button on the mixed-input pointing device. Advantageously, the pressure button is used in free space, while the pressure tip can be used on a surface. In one example of using the pressure data, a user can operate the mixed-input pointing device such that the width of a pen-like stroke using the mixed-input pointing device is based on pressure data. The surface pressure data can, in particular, be used to determine an angle of the mixed-input pointing device against the surface to impact the output and controls performed on interface objects. Additionally, the mixed-input pointing device can be constructed with a haptic feedback object that provides a sense of touch to the user of the mixed-input pointing device. The haptic feedback object can be caused to generate forces, vibrations or motions corresponding to interface controls for integrated free space and surface inputs form the mixed-input pointing device. As such, the mixed-input pointing device provides unified controls for computing system interfaces based on free space and surface inputs. The unified controls can advantageously provide for mixed-input interface controls based on flexible free space input and precise controls from surface inputs while automatically transitioning between free space inputs and surface inputs.

With reference to FIG. 1, embodiments of the present disclosure can be discussed with reference to an exemplary integrated free space and surface input system 100 that is an operating environment for implementing functionality described herein. The integrated free space and surface input system 100 includes an integrated free space and surface input mechanism 110 comprising a mixed-input pointing device 120, a computing device 140, a head mounted display 150 device. The computing device 140 may include any type of computing device described below with reference to FIG. 10, and the HMD 150 may include any type of HMD or augmented reality device described below with reference to FIGS. 8 and 9. For detailed discussion purposes, the augmented reality device is an exemplary head mounted display (HMD) 150 device, but other types of augmented reality devices are contemplated with embodiments of the present disclosure. The HMD 150 is a scene-aware device that understands elements surrounding a real world environment and generates virtual objects to display as augmented reality images to a user. HMD 150 can be configured to capture the real world environment based on components of the HMD 150. The HMD 150 can include a depth camera and sensors that support understanding elements of a scene or environment, for example, generating a 3-D mesh representation of a real world environment. The HMD 150 can also include an augmented reality emitter 152 for projecting virtual objects or images in the real world based at least in part of the 3-D mesh representation. In this regard, the HMD 150 can specifically include functionality (e.g., augmented reality or mixed-reality experiences) that can be supported using the mixed-input pointing device 120 operating based on the integrated free space and surface input mechanism 110. A mechanism as used herein refers to any device, process, or service or combination thereof. A mechanism may be implemented using components as hardware, software, firmware, a special-purpose device, or any combination thereof. A mechanism may be integrated into a single device or it may be distributed over multiple devices. The various components of a mechanism may be co-located or distributed. The mechanism may be formed from other mechanisms and components thereof. The components of the integrated free space and surface input mechanism 120 facilitate providing integrated free space and surface input.

Figure 2A:
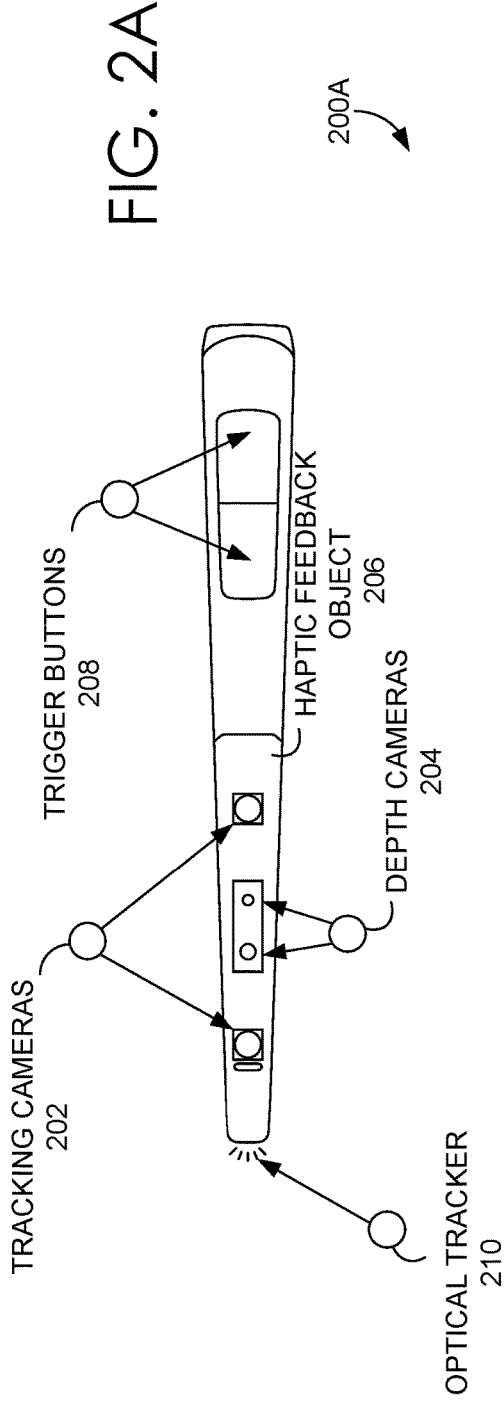
FIG. 2A is an illustration of a top view of an exemplary mixed-input pointing device, in accordance with embodiments of the present invention.
Figure 2B:
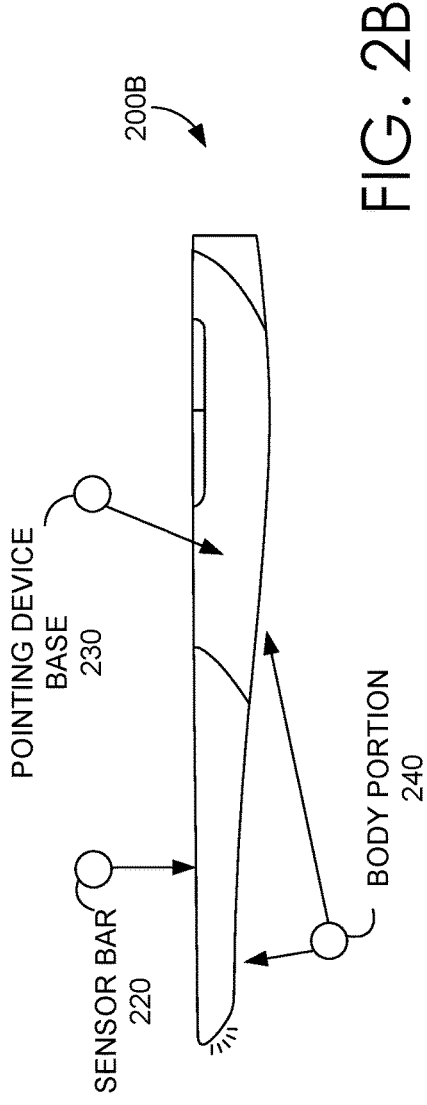
FIG. 2B is an illustration of a side view of an exemplary mixed-input pointing device, in accordance with embodiments of the present invention.

With reference to FIGS. 2A and 2B, an exemplary top view of mixed-input pointing device 200A ("pointing device" 200A) and an exemplary side view of mixed-input pointing device 200B ("pointing device" 200B) are illustrated, respectively. The mixed-input pointing device is constructed as a pen-like controller having several components that support generating and communicating integrated free space and surface input. As shown in FIG. 2A, the pointing device 200A includes tracking cameras 202, depth cameras 204, a haptic feedback object 206, trigger buttons 208, and an optical tracker 210. As shown in FIG. 2B, the pointing device 200B includes a sensor bar 220, pointing device base 230, and a body portion 240. Amongst other components not shown, the mixed-input pointing device can also include communication media, a processor, memory, an interface, a bus and a power supply that operate to support the functionality described herein.

At a high level, a user can hold and control the pen-like controller to generate input. It is contemplated that the sensor bar 220 can be configured to be detachably attached to the pointing device base 230. The detachable sensor bar 220 can support different types of bases for the pointing device. Different base constructions can support different types of functionality associated with the base. For example, the pen-like base can be swapped with a sword-like base for playing a video game that involves sword-play, providing the user with a more immersive gaming experience. The base, whether detachable or not detachable, can also include control actuators that are associated with inputs that are generated based on the sensor bar 220. In one exemplary implementation of the sensor bar 220, the sensor bar 220 can include tracking cameras 202 and depth cameras 204 (e.g., IR and RGB cameras) support tracking free space input and the optical tracker 210 tracks surface input. The sensor bar 220 may additionally or alternatively include magnetic sensors using an external magnetic field generator for 3D tracking. The different types of 2D or 3D tracked inputs can be processed, in particular, when a user moves from providing free space input to surface input, or from surface input to free space input. The sensor bar 220 can also include the magnetic sensors and audio microphones for capturing and communicating other types of input. The mixed-input pointing device processes the input and then starts communicating the processed input as output accordingly. The output may be wirelessly transmitted (e.g., infrared radiation, radio, light-based communications means, Bluetooth, etc.) to a computing device to control a graphical user interface of the computing device. In this regard, control of a graphical user interface can be based on free space input that transitions to surface input or surface input that transitions to free space input.

The mixed-input pointing device supports additional interface controls based on the trigger buttons 208 and pressure sensors (not shown). For example, the tip of the mixed-input pointing device may include a pressure sensor for surface pressure data and a pressure button may include a pressure sensor for free space pressure data. The mixed-input pointing device can also operate to received haptic feedback (e.g., sense of touch based on applying forces, vibrations or motions) via the haptic feedback object 206 based on free space and surface input that is communicated as output. Other types of outputs are possible from the mixed-input pointing device. Outputs can be based on inputs from movement data that is tracked at the mixed-input pointing device or from communications from external devices communicating with the mixed-input pointing device. Examples of outputs can include radio or light communication means, audio, light, display, and projections. The different outputs can be supported by corresponding hardware components built into the mixed-input pointing device. Details of components of the mixed-input pointing device are discussed further below.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Turning to the components of FIG. 1, the mixed-input pointing device 120 includes a free space tracking component 122 and a surface tracking component 124. The mixed-input pointing device 120 further includes an integrated processing component 130, a trigger component 132, a pressure tracking component 134, and a haptic feedback component 136. At a high level, the mixed-input pointing device 120 can be controlled by a user to generate free space input or surface input. The input is generated based on the free space tracking component 122 and surface tracking component 124 determining free space movement data and surface movement data respectively. The integrated processing component 130 processes free space input or surface input based on referencing movement data. In particular, processing the free space input or surface input can be based on referencing movement data transitioning from the free space input to the surface input or transitioning from the surface input to the free space input. In this regard, processing based on the referencing the movement data can include identifying free space movement data, identifying surface movement data; and generating an output using the free space movement data and the surface movement data, where movement data indicates at least a transition from the first input to the second input. The movement indicates the transition in that the tracking will include movement data of the user moving from the first input to a second input. The transition can be identified and used to generating appropriate output for controls of the interface. The integrated processing component 130 then communicates an output for the free space input or surface input, the output is generated based on free space movement data and surface movement data (or lack thereof). The free space movement data and surface space movement data can define transition movement data as input transitions transition free space and surface inputs. The output can be used to control interface objects of the computing device 140 associated with the computer display 142 or the HMD 150 associated with an augmented reality emitter 152.

The free space tracking component 122 and the surface tracking component 124 are responsible for tracking movement associated with the mixed-input pointing device. The free space tracking component 122 and the surface tracking component 124 may implement different coordinate spaces that are used to understand the movement in free space and on a surface respectively. Coordinate space can indicate how the movement data is represented. The coordinate spaces can be integrated to understand the motion in free space and on a surface together. The coordinate spaces can be used to determine movement data in free space and movement data on a surface that are communicated the integrated processing component 130.

Each of the free space tracking component 122 and the surface tracking component 124 can include or be associated with hardware components (e.g., sensors and cameras) that facilitate tracking the movement data. By way of example, the free space tracking component 122 can be implemented based on an inertial measurement unit (IMU) and cameras that are built into the mixed-input pointing device 120. The IMU is an electronic device that measures and reports motion attributes of the mixed-input point device. The IMU can measure and report mixed-input pointing device 120 specific force, angular rate and magnetic field based on a combination of accelerometers and gyroscopes, and magnetometers. The IMU can operate as an orientation sensor in free space. In this regard, the mixed-input pointing device can be tracked in based on multiple degrees of freedom. The free space tracking component 122 can include cameras that operate as environment understanding sensors. The cameras can be Infrared cameras (IR), RGB cameras, or depth cameras. The free space tracking hardware components can be part of a sensor bar, as disclosed in the mixed input pointing device shown in FIGS. 2A and 2B, where the sensors and cameras are along a body portion 240 of the mixed-input point device. The mixed-input pointing device 120 movement can be tracked in 3D space as free space movement data based on the coordinate space of the free space tracking. When a user moves the mixed-input pointing device in free space the movement is captured as movement data that can be communicated as output to control a graphical user interface.

With reference to the surface tracking component 124, surface movement can be detected using a mechanical device (e.g., trackball) or advantageously may be detected using an optical tracker. In particular, movement relative to a surface can be based on a light source (e.g., light emitting diode (LED) and an array of photodiodes. As shown in the exemplary mixed-input pointing device in FIGS. 2A and 2B, the optical tracker 210 can be located at a front portion (e.g., tip) of the mixed-input pointing device. The mixed-input pointing device movement can be tracked in 2D space based on the coordinate space of 2D tracking. An integrated 2D and 3D coordinate space can also independently track 2D movement or 3D movement. 2D and 3D coordinate spaces, their different configuration, can be tracked independently and in combination as needed to provide functionality described herein. In particular, the mixed-input pointing device can be tracked as the user transitions from free space input to surface input or from surface input to free space input.

Free space input tracking may continue when surface input is detected and tracked. The movement data of the free space input can be further incorporated in understanding movement relative to a surface. For example, free space movement data can facilitate determining where the user is providing input based on a horizontal surface or a vertical surface. The tracking components can also track free space input and surface input that generates movement data that corresponds to mixed-input gestures. In other words, stylized motion that includes both free space input and surface input can support issuing commands or map to specific controls for an interface. The movement data for mixed-input gestures are also communicated as output that is translated into gestured-based controls on an interface.

The integrated processing component 130 is responsible for processing different types of input at the mixed-input pointing device to perform operations. Input can include communications from internal components or external components that are processed at the integrated processing component 130. The integrated processing component 130 can process free space input, surface input, trigger input, pressure input and haptic feedback input for corresponding components of the mixed-input pointing device. As discussed herein, the different types of inputs are associated with hardware components (e.g., sensors, cameras, haptic feedback object). Some components operate to facilitate capturing data associated with the inputs that are communicated to the integrated processing component 130. The integrated operation component 130 operates using communication media (e.g., connectivity or communications protocols) that help transmit processed inputs as outputs to control interfaces. The integrated processing component 130 can perform processing and communicate outputs to facilitate transitioning input in combination with additional functionality supported at the mixed-input pointing device. Output which is being communicated, can trigger controls, feedback, and interactivity for the computing device 140 having the computer display 142 to control computer display objects. The output can also be for the HMD 150 having the augmented reality emitter to control augment reality objects.

The trigger component 132 is responsible for processing input based on buttons of the mixed-input pointing device 120. The trigger component 132 can be associated with a physical trigger button that is constructed as part of the mixed-input pointing device 120. The button can be snap-action switch or a micro switch that operates as an electrical switch that is actuated with physical force on a button of the mixed-input pointing device 120. The trigger component 132 can detect the different types of trigger inputs from the mixed-input pointing device 120 to communicate trigger data to the integrated processing component 130.

Trigger buttons can be associated with different types of functionality. In one embodiment, the mixed-input pointing device 132 can include two trigger buttons that operate based on conventional mouse right click and left click functionality. In this regard, trigger buttons can be designated as right and left trigger buttons corresponding to right and left mouse buttons. The trigger data in combination with movement data can be used to generate output that controls interface objects. For example, a trigger button input in combination with free space input can generate a first set of controls for interface objects that are different from a trigger button input in combination surface input that can generate a second set of controls for interface objects. The type of display associated with the interface object can also affect the type of interface control that is performed. For example, an interface object can be an augmented reality object displayed in free space or displayed on a surface; and the interface object can be a computer display object that is displayed on a computer display, where in each case, the trigger button along with input movement data perform different types of interface controls.

Trigger buttons can also be used for any of the following: tipping-point mechanism, button chording, and mixed-input gestures. A tipping-point mechanism can refer to a displacing an object from a stable equilibrium state to a new equilibrium state. For example, a drag and drop action can be performed using designated input based on the trigger button and input movement data. Button chording can refer to the capacity to perform actions when multiple buttons are held down. As such, the trigger buttons, input movement data and optionally keyboard key can all be combined to perform interface controls when designated combinations are actuated together. Mixed-input gestures can refer to ways of combining any of the following: mixed-input point device, finger movements and clicks to perform specific interface controls. For example, a particular gesture in free space combined with a gesture on a surface can be designated to perform a particular interface control. The different interface controls can further be defined for operations related to transition from free space input to surface input or from surface input to free space input. Trigger buttons can also be used for other functionality such as selecting operating modes (e.g., integrated mode, surface tracking only mode, or free space tracking only mode).

The trigger buttons, as described, support receiving additional controls used in combination with the mixed-input pointing device. The mixed-input pointing device can also operate with touch-sensitive interfaces that either replace or operation in combination with the trigger buttons. The touch-sensitive interfaces can include components that are built into the mixed-input device or components that are independent of the mixed-input pointing device. For example, a touchpad component or device can be associated with the mixed-input pointing device. The touchpad includes a tactile sensor. The tactile sensor can specifically operate as a specialized surface that can translate motion and position relative to the surface. A touchscreen electronic visual display can also operate with mixed-input pointing device to receive inputs via the touchscreen. A user can use their fingers on the touch-sensitive interfaces or use the mixed-input pointing device on the touch sensitive interfaces. The mixed-input pointing device inputs, in combination with inputs from the touch-sensitive interfaces, can trigger specifically defined controls for the graphical user interface. For example, a gesture-based control can be defined based on a combination of finger input on a touchpad and input from the mixed-input pointing device. Other variations and combinations of trigger button and touch-sensitive interface functionality supported through the trigger component and touch-sensitive interfaces are contemplated with embodiments of the present disclosure.

The pressure tracking component 134 is responsible for processing input based on pressure associated with the mixed-input pointing device 120. The pressure tracking component 134 can be associated with a pressure sensor that measures and reports pressure data. The pressure sensor can located at the tip of the mixed-input pointing device 120. Pressure data measured at the tip can be associated with surface movement data. The pressure sensor can be a pressure button, advantageously constructed on a body portion 240 of the mixed-input pointing device 120. Pressure data from the pressure button can be associated with free space movement data. The pressure data can be communicated to the integrated processing component 130 to perform operations based on the pressure data. The pressure data can be combined with other data (e.g., movement data and trigger data) received at the integrated operation component 130. For example, pressure data relative to a surface or free space can be used to accurately determine the size of keystrokes, for fine-point precision and accuracy, and for shortcut buttons for applications. Other variations and combinations of pressure data used to controls for interface objects are contemplated with embodiments of this disclosure.

The haptic feedback component 136 is responsible for processing input received to actuate haptic feedback. Haptic feedback can refer to the application of forces, vibrations or motions at the mixed-input pointing device 120 to recreate a sense of touch. The haptic feedback can be associated with a haptic feedback object that is a device that generates the haptic feedback on the mixed-input pointing device 120. The haptic feedback object 206, as shown in FIG. 2A can be located along the body of the mixed-input point device, and advantageously as part of the sensor bar. The haptic feedback component 136 receives haptic feedback input directly at the haptic feedback component 136 or via the integrated processing component 130. The haptic feedback input can be received in response to output that is communicated to a computing system from the integrated processing component 130. Free space input, surface input, or a combination thereof that is communicated as output can be processed to generate haptic feedback input for the haptic feedback component 136. The haptic feedback may be processed and determined wholly within the mixed-input pointing device.

The different types of inputs that are received at the mixed-input pointing device 120 can correspond to different types of haptic feedback. Haptic feedback can be associated with operations that include transitioning from free space to surface input or from surface to free space input. The haptic feedback input can be haptic feedback data that is used to trigger the haptic feedback object such that a user operating the mixed-input pointing device can feel the haptic feedback. In this regard, by way of example, the haptic feedback object may vibrate with less force when an input is surface input and vibrate with more force when the input is free space input. Other variations and combinations of haptic feedback are contemplated with combinations of the present disclosure.

Figure 3:
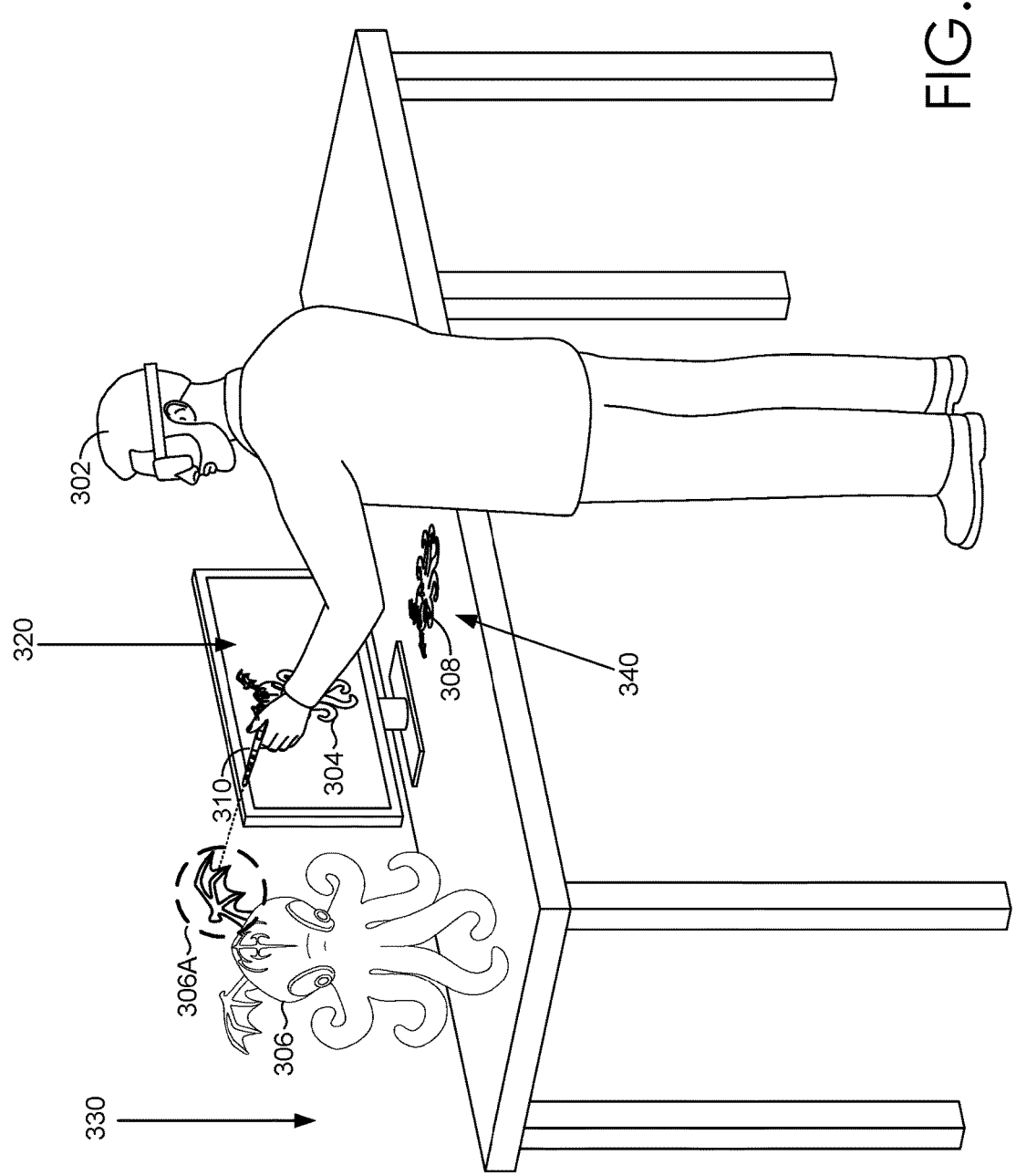
FIG. 3 is an illustration of an exemplary implementation of an integrated free space and surface input system, in accordance with embodiments of the present invention.
Figure 4:
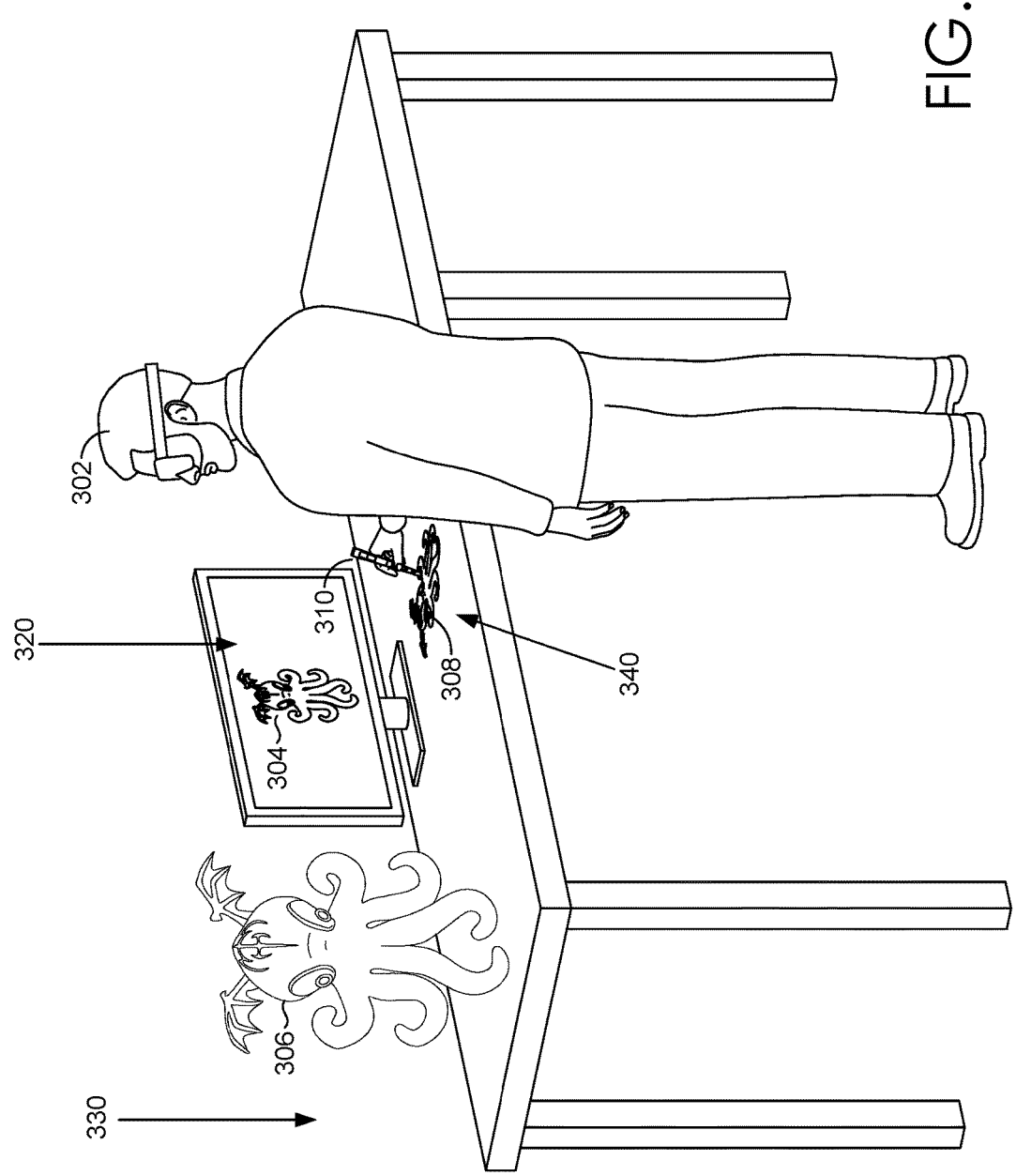
FIG. 4 is an illustration of an exemplary implementation of an integrated free space and surface input system, in accordance with embodiments of the present invention.
Figure 5:
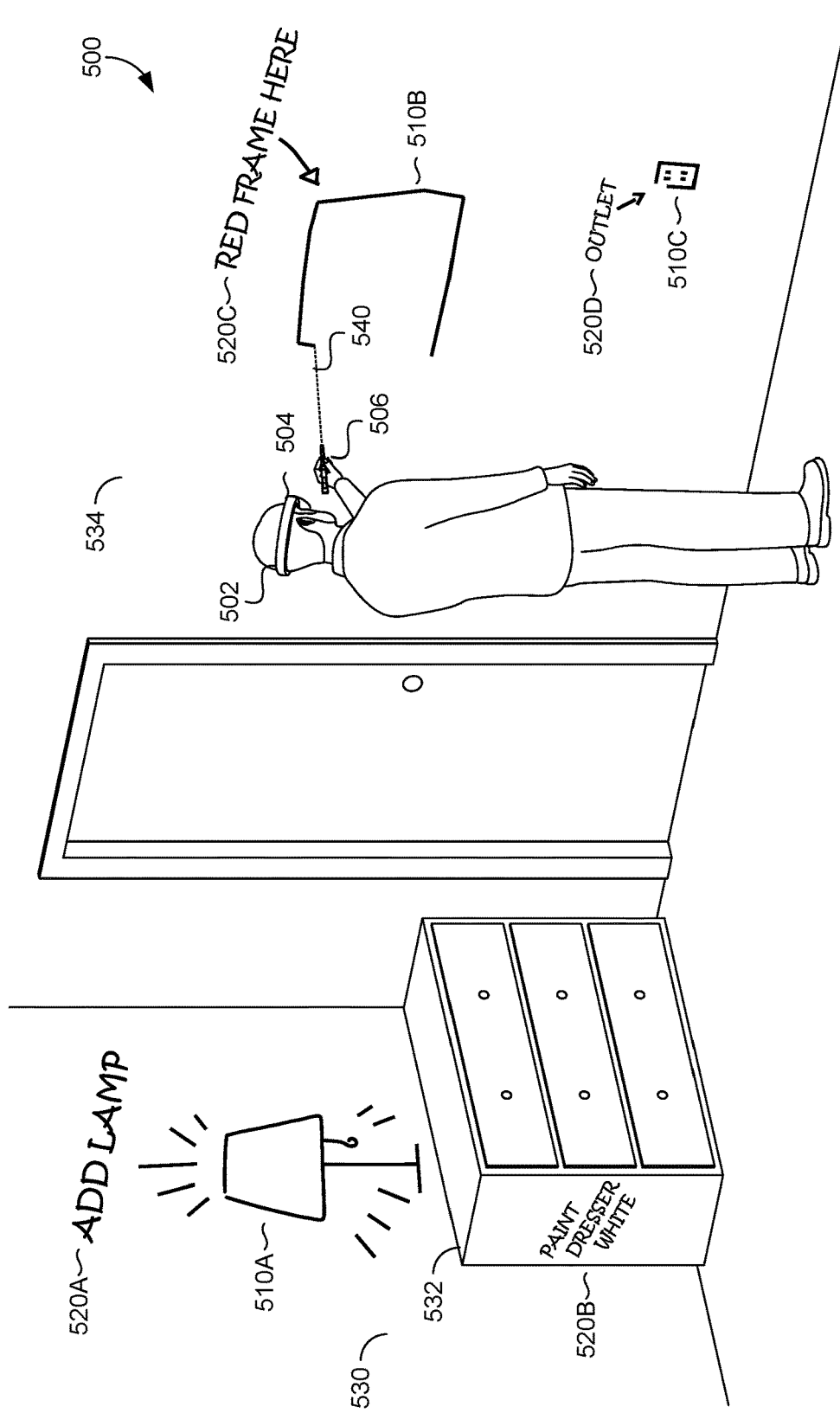
FIG. 5 is an illustration of an exemplary implementation of an integrated free space and surface input system, in accordance with embodiments of the present invention.

With reference to supplemental FIGS. 3, 4 and 5, several illustrations of exemplary implementations of a mixed-input pointing device, in accordance with embodiments of the present disclosure, are provided. FIG. 3 shows a user 302, a computer display object 304, a free space object 306, a surface object 308, a mixed-input pointing device 310, display device 320, free space 330, and surface 340. A user 302 can operate a mixed-input pointing device 310 in free space 330 or a surface 340 to generate input corresponding to free space input or surface input. The input can be used to control graphical user interface objects. The graphical user interface objects can be on the display device 320, free space 330 or surface 340. The different representations of the graphical user interface objects can be displayed independently or in combination with each other. The type of graphical user interface object can be displayed based on the type of input received from the mixed-input pointing device 310 or based on a user selection for what type of graphical user interface object to control. The different displays of the graphical user interface objects can be controlled from any input types and the different displays can be simultaneously updated based on the different types of inputs to control the interface. Moreover, the integrated processing functionality includes movement data when the user transitions free space input to surface input or from surface input to free space input to provide a seamless continuous control of the graphical user interface. Integrated movement data can include tracking free space movement data that transitions to free space movement data and surface movement data or tracking surface movement data and free space movement data that transitions to free space movement data.

The user can move the mixed-input pointing device in free space to generate free space input. The free space input can be tracked to determine free space movement data that is captured using sensors at the mixed-input pointing device 310. A free space tracking component can be used to determine and communicate the free space movement. The free space input is processed at the integrated processing based on accessing the free space movement data and communicated as output to a graphical interface object. In particular, free space input can be used to control the free space object 306; a specific portion 306A can be identified and selected to be controlled. As shown in FIG. 4, the user can also move the mixed-input point device on a surface to generate surface input. The surface input can be tracked to determine surface movement data that is captured using sensors in the mixed-input pointing device 310. A surface input tracking component can be used to determine and communicate the surface movement. The surface input is processed based on accessing the surface movement data and communicated as output to control a graphical interface component.

In FIG. 5, an exemplary augmented reality experience or mixed reality experience based on a user 502 wearing an HMD 504, the user operating the mixed-input pointing device 506, is illustrated. The HMD 504 can have an understanding of elements in the environment to generate augmented reality images based on the environment. The augmented reality images can include augmented reality objects that are virtual objects or images generated, based on actions performed by the user, and projected in the real world environment. The augmented reality objects can be configured to be landlocked or real world locked to real world objects. The user can cause mixed-reality content to be generated free space based on moving the mixed-input pointing device. By way of example, image-based content (e.g., 510A, 510B and 510C) can be generated and also text-based content (e.g., 520A, 520B, 520C and 520D) can be generated and projected in free space. The projected augmented reality objects can be locked to portions of the environments and relative to each other. For example, the lamp 510A can be projected a on wall 530 and displayed alongside "add lamp" 520A. The text-based content "dresser goes here" 520 can be displayed landlocked to the physical dresser 532. "Red frame here" 520 is displayed on wall 534 in combination with the drawing of the frame 510B and "outlet" 520D is projected next to physical outlet 536 with an outline 510C around the socket. The projected images can be projected using holographic ink, to simulate the experience of writing on real word objects and wall in real time. The HMD 504 can support projecting a visual connector 540 between the mixed-input pointing device 506 and holographic ink projected in the surrounding environment. The visual connector 540 may project from a position proximate a tip portion of the mixed-input pointing device to a position proximate the holographic ink that is being generated based on the actions of the user 502.

Figure 6:
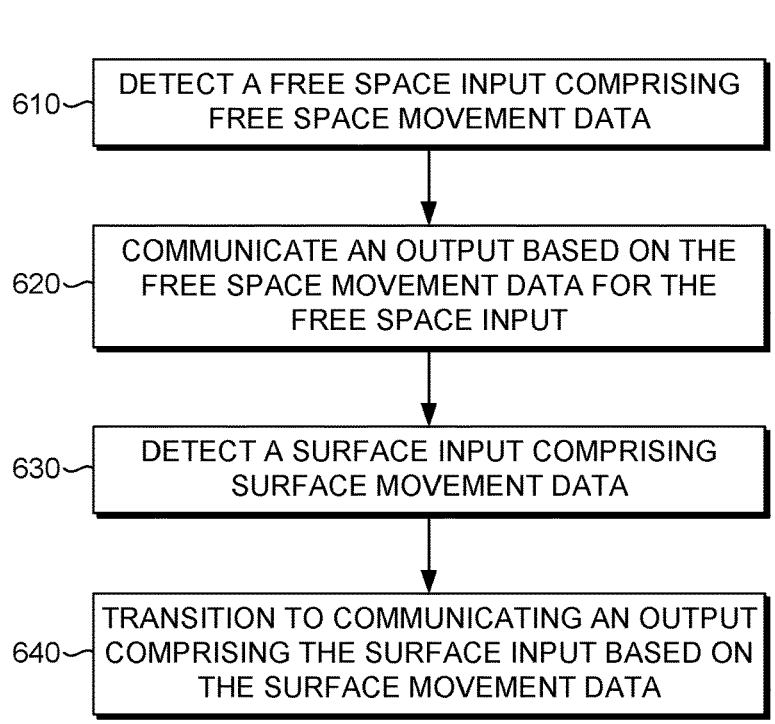
FIG. 6 is a flow diagram showing a method for implementing an integrated free space and surface input system, in accordance with embodiments of the present invention.

With reference to FIG. 6, a method for generating an integrated free space and surface input is provided. Initially at block 610, a free space input including free space movement data is detected. A free space tracking component can be responsible for tracking free space movement data for the mixed-input pointing device. The free space movement data is associated with a mixed-input pointing device that supports free space tracking and surface tracking. At block 620, an output based on the free space movement data for the free space input is communicated. An integrated processing component can be responsible communicating the output. The free space input is associated with a graphical interface object.

At block 630, a surface input including surface movement data is detected. The surface movement data is associated with the mixed-input pointing device that transitions from free space input to surface input. The mixed-input pointing device generates surface movement data based on a light detector or other types of sensors that track surface movement. When the mixed-input pointing device is generating surface movement data, the surface movement data operates as an indicator to transition from processing exclusively free space movement data to processing the surface movement data and the free space movement data. The surface input can be detected on a horizontal surface, a vertical surface and any other angular surface there between. A substantially horizontal surface or a substantially vertical can be distinguished from each other at least in part on the free space movement data that is simultaneously being tracked at the free space tracking component.

The surface input can further be associated with surface pressure data. In one exemplary implementation, the mixed-input pointing device includes a tip portion that is operationally couple to a surface pressure sensor to generate surface pressure data. An input angle of the mixed-input pointing device against a surface can be determined based on a combination of the surface pressure data and the free space movement data. The input angle can impacts the type of output that is generated, in particular, the type of controls of the graphical interface object that are executed.

At block 640, the mixed-input pointing device transitions to communicating output comprising the surface input based on the surface movement data. The surface input is associated with the graphical interface object. The output can be utilized in instructions for controlling a graphic user interface. The graphical user interface can be associated a computer display of a computer monitor or an augmented reality display area (free space or surface) of a head mounted display with free space. In addition, executing at least a subset of the controls includes generating free space haptic feedback or surface haptic feedback. In embodiments, there are two representations of the graphical interface object that can be simultaneously displayed. The first representation of the graphical interface object is controllable based on the free space input and the second representation of the graphical object is controllable based on the surface input.

Figure 7:
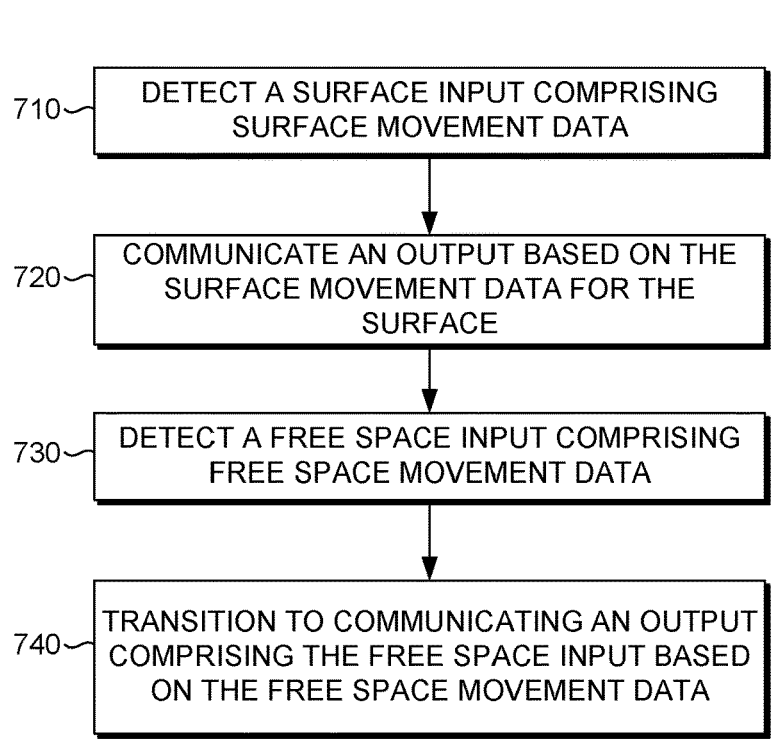
FIG. 7 is a flow diagram showing a method for implementing an integrated free space and surface input system, in accordance with embodiments of the present invention.

With reference to FIG. 7, a method for generating an integrated free space and surface input is provided. A computer storage medium can include computer-executable instructions that when executed by a processor causes the processor to perform the method.

Initially at block 710, surface input including surface movement data is detected. The surface tracking component can be responsible for tracking surface movement data for the mixed-input pointing device. The surface movement data is associated with a mixed-input pointing device that supports surface tracking and free space tracking. At block 720, an output based on the surface movement data is communicated. The surface input is associated with a graphical interface object.

At block 730, a free space input including free space movement data is detected. The free space movement data is associated with the mixed-input pointing device that transitions from surface input to free space input. Detecting the free space input can include identifying free space input to be processed based at least in part on not detecting the surface input. In embodiments, the free space input is associated with free space pressure data based on a user-operated button of the mixed-input pointing device operationally coupled to a free space pressure sensor. The graphical interface object can be an augmented reality object that is rendered in the real world environment based on an augmented reality device. The augmented-reality object may be displayed on a surface area and a free space area.

Figure 8:
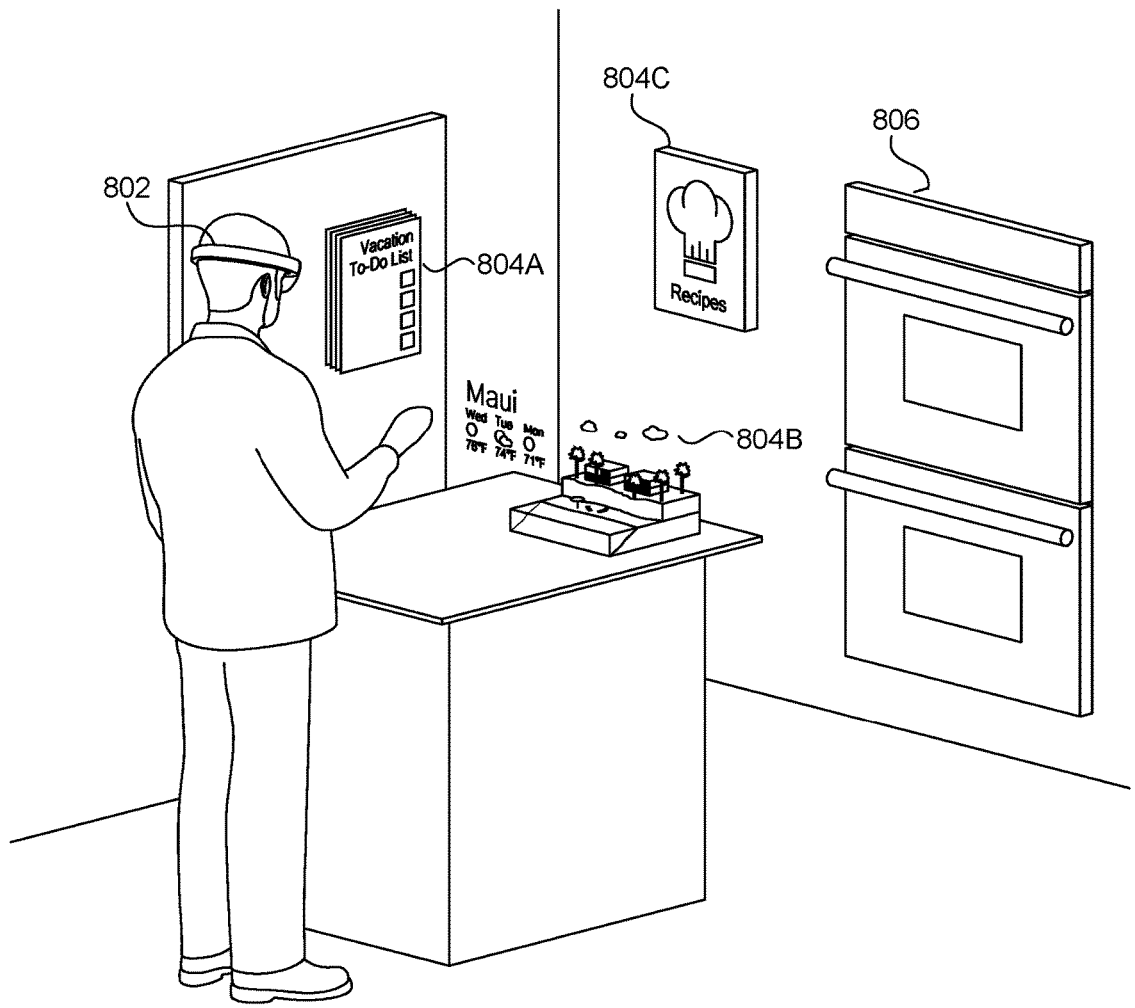
FIG. 8 is an illustrated diagram showing exemplary augmented reality images of a head-mounted display device, in accordance with embodiments of the present invention.

With reference to FIG. 8, exemplary images of a head-mounted display (HMD) device 802 are depicted. Augmented reality images (e.g., 804A, 804B and 804C), comprising corresponding virtual images provided by the HMD 802 device, generally include the virtual images that appear superimposed on a background and may appear to interact with or be integral with the background 806. The background 806 is comprised of real-world scene, e.g., a scene that a user would perceive without augmented reality image emitted by the HMD 802 device. For example, an augmented reality image can include the recipe book icon 804C that appears superimposed and hanging in mid-air in front of the cooking oven or wall of the background 806.

Figure 9:
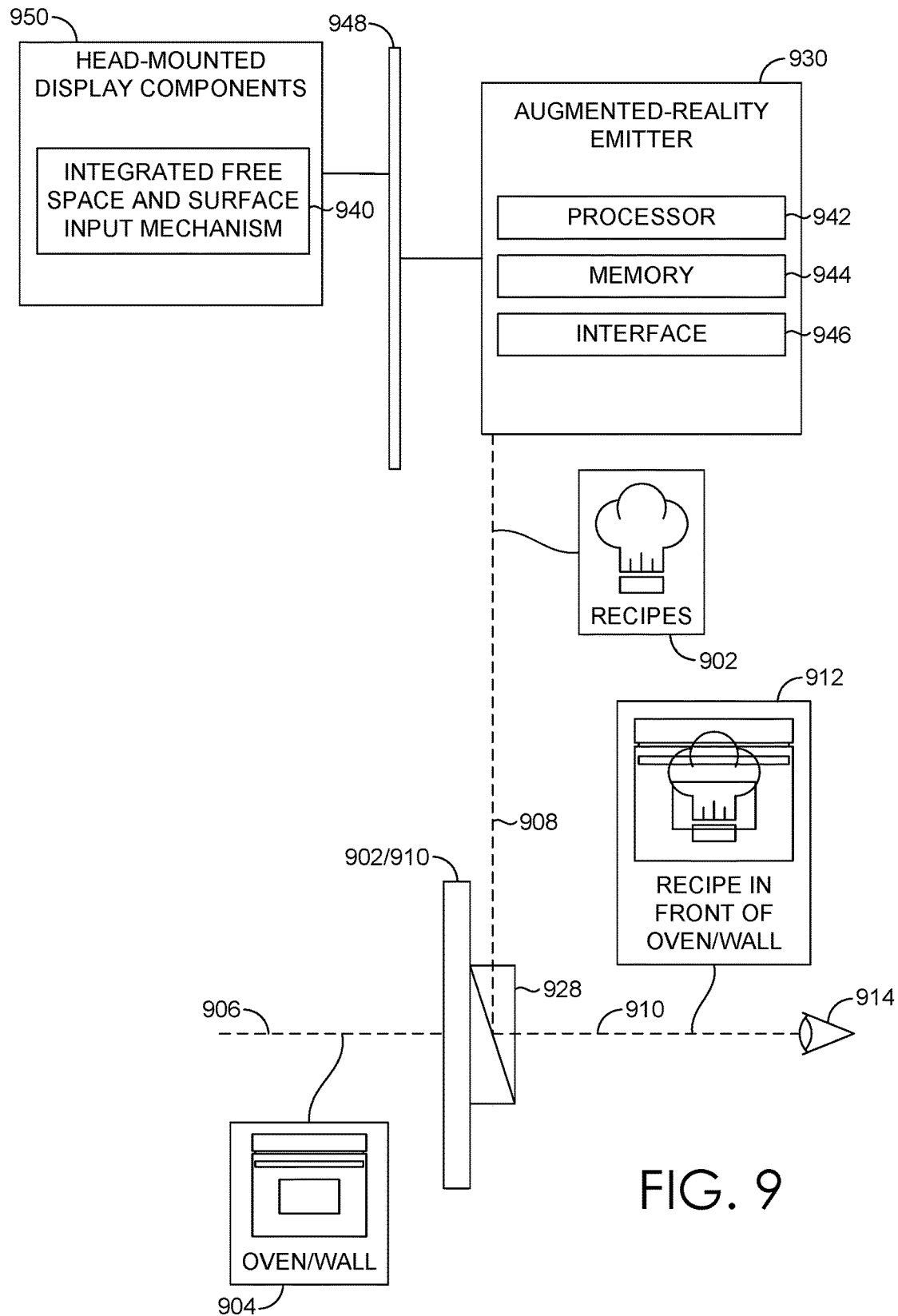
FIG. 9 is a block diagram of an exemplary head-mounted display device, in accordance with embodiments of the present invention.

Turning to FIG. 9, the HMD device 902 having the user-height-based rendering mechanism 940 is described in accordance with an embodiment described herein. The HMD device 902 includes a see-through lens 910 which is placed in front of a user's eye 914, similar to an eyeglass lens. It is contemplated that a pair of see-through lenses 910 can be provided, one for each eye 914. The lens 910 includes an optical display component 928, such as a beam splitter (e.g., a half-silvered mirror). The HMD device 902 includes an augmented reality emitter 930 that facilitates projecting or rendering the of augmented reality images. Amongst other components not shown, the HMD device also includes a processor 942, memory 944, interface 946, a bus 948, and additional HMD components 950. The augmented reality emitter 930 emits light representing a virtual image 902 exemplified by a light ray 908. Light from the real-world scene 904, such as a light ray 906, reaches the lens 910. Additional optics can be used to refocus the virtual image 902 so that it appears to originate from several feet away from the eye 914 rather than one inch away, where the display component 928 actually is. The memory 944 can contain instructions which are executed by the processor 942 to enable the augmented reality emitter 930 to perform functions as described. One or more of the processors can be considered to be control circuits. The augmented reality emitter communicates with the additional HMD components 950 using the bus 948 and other suitable communication paths.

Light ray representing the virtual image 902 is reflected by the display component 928 toward a user's eye, as exemplified by a light ray 910, so that the user sees an image 912. In the augmented-reality image 912, a portion of the real-world scene 904, such as, a cooking oven is visible along with the entire virtual image 902 such as a recipe book icon. The user can therefore see a mixed-reality or augmented-reality image 912 in which the recipe book icon is hanging in front of the cooking oven in this example.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 10:
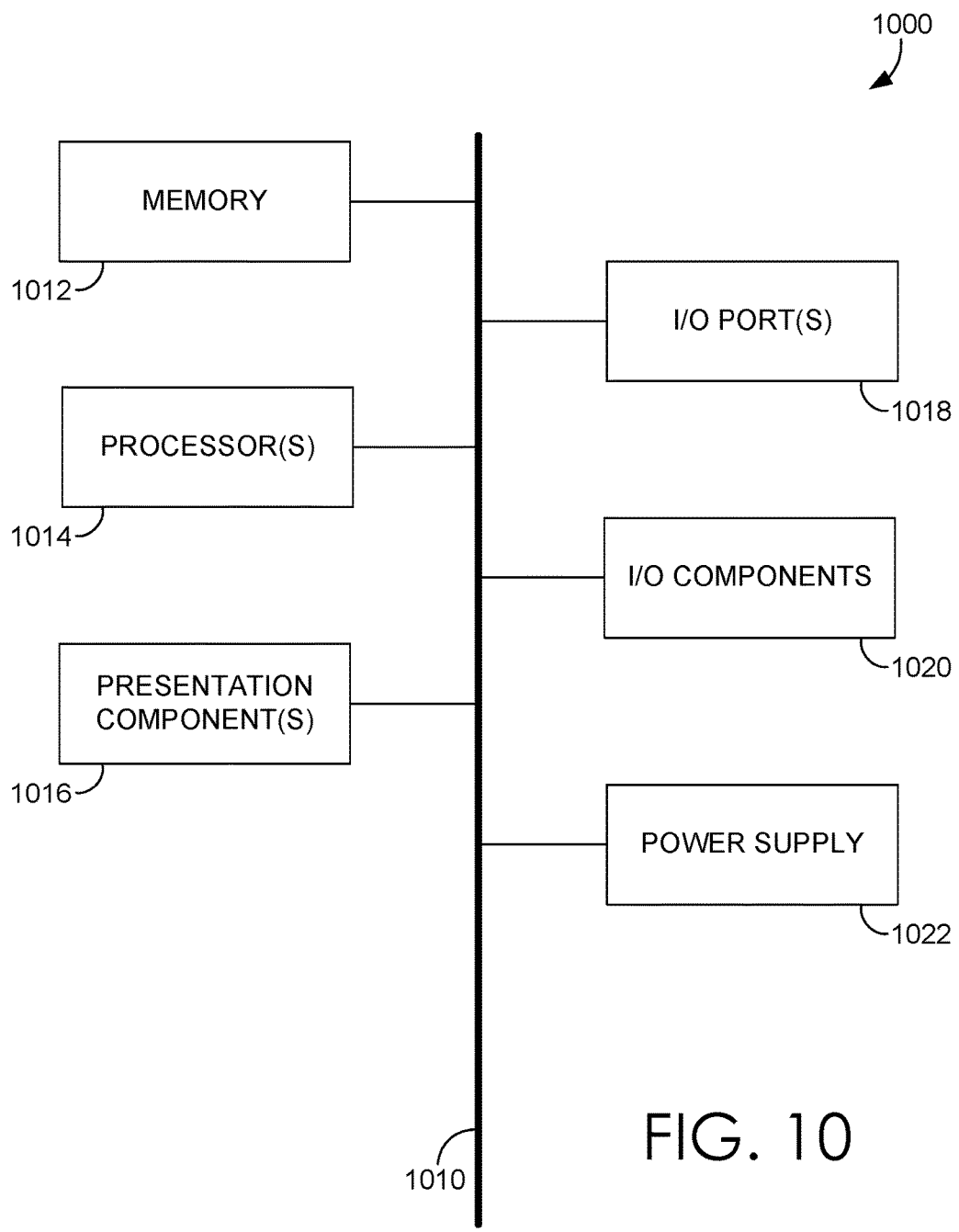
FIG. 10 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 10 in particular, an exemplary operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 10, computing device 1000 includes a bus 1010 that directly or indirectly couples the following devices: memory 1012, one or more processors 1014, one or more presentation components 1016, input/output ports 1018, input/output components 1020, and an illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 10 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a head-mounted display device as an augmented reality device; however the head-mounted display device depicted herein is merely exemplary. Components can be configured for performing novel aspects of embodiments, where configured for comprises programmed to perform particular tasks or implement particular abstract data types using code. Further, while embodiments of the present invention may generally refer to the head-mounted display device and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. An electronic pointing device comprising:
    a free-space tracking component configured to determine free-space movement data including position coordinates of the electronic pointing device;
    a surface tracking component configured to determine surface movement data of the electronic pointing device;
    an integrated processing component configured to provide output responsive to the free-space movement data and to the surface-movement data to a remote computer system, such output including a transition between the free-space movement data and the surface-movement data; and
    a haptic mechanical element configured to provide haptic feedback pursuant to the transition.

2. The electronic pointing device of claim 1, wherein the electronic pointing device is a controller having at least one micro-switch button operable to cause interaction with a graphical user interface object of the remote computer system;
wherein
the free-space tracking component includes one or more of a camera and an inertial measurement unit and wherein
the surface tracking component includes a light detector configured to detect motion on the surface.

3. The electronic pointing device of claim 1, further comprising a pressure sensor configured to determine
surface-pressure data at a tip of the electronic pointing device and/or
free-space pressure data from a button of the electronic pointing device.

4. The electronic pointing device of claim 1, wherein the electronic pointing device is associated with a computer display configured to display a free-space rendering of an object and a surface rendering of the object.

5. The electronic pointing device of claim 1, wherein the electronic pointing device continuously tracks free-space movement data and tracks surface movement data when the electronic pointing device is associated with the surface, wherein a free-space representation of a graphical object of the remote computer system is controllable based on the free-space movement data and a surface representation of the graphical object is controllable based on the surface movement data.

6. The electronic pointing device of claim 5, wherein the haptic feedback component is configured to provide both free-space haptic feedback and surface haptic feedback, and wherein the haptic feedback component transitions from the free-space haptic feedback to the surface haptic feedback and from the surface haptic feedback to the free-space haptic feedback corresponding to the free-space or surface movement data on which the output is based.

7. Enacted by an electronic pointing device configured for free-space and surface tracking, a device-implemented method for providing integrated free-space and surface input to a remote computer system, the method comprising:
determining free-space movement data including position coordinates of the electronic pointing device;
communicating output based on the freed-space movement data;
determining surface movement data including surface-pressure data and position coordinates of the electronic pointing device on a surface;
determining an angle between the electronic pointing device and the surface based on the free-space movement data and the surface-pressure data; and
stopping communication of the output based on free-space movement data and communicating output based on the surface movement data in response to pressure of the electronic pointing device on the surface, wherein the output based on the surface movement data is further based on the angle.

8. The method of claim 7, wherein the surface movement data is determined via a light detector of the electronic pointing device configured to track surface movement.

9. The method of claim 7, wherein inclination of the surface is distinguishable based on the free-space movement data.

10. The method of claim 7, wherein the surface pressure data is determined via a surface pressure sensor arranged on a tip of the electronic pointing device.

11. The method of claim 7, wherein the output is configured to control a graphical user interface of the remote computer system.

12. The method of claim 7 further comprising generating free-space haptic feedback when the output based on the free-space movement data is communicated and surface haptic feedback when the output based on the surface movement data is communicated.

13. The method of claim 7, wherein a free-space representation of a graphical interface object of the remote computer system is controllable based on the free-space movement data, and wherein a surface representation of the graphical interface object is controllable based on the surface movement data.

14. Enacted by an electronic pointing device configured for free-space and surface tracking, a device-implemented method for providing integrated free-space and surface input to a remote computer system, the method comprising:
determining surface movement data including surface-pressure data and position coordinates of the electronic pointing device on a surface;
communicating output based on the surface movement data;
determining free-space movement data including position coordinates of the electronic pointing device; and
stopping communication of the output based on the surface movement data and communicating output based on the free-space movement data in response to a loss of pressure of the electronic pointing device on the surface;
wherein a free-space representation of a graphical interface object of the remote computer system is controllable based on the free-space movement data, and wherein a surface representation of the graphical interface object is controllable based on the surface movement data.

15. The method of claim 14 further comprising determining free-space pressure data from a user-operated button of the electronic pointing device operationally coupled to a free-space pressure sensor.

* * * * *